April 14, 1970   R. M. RIDDLE, JR., ET AL   3,506,808
VOLUME-OCCUPANCY CONTROL OF TRAFFIC FLOW
Filed March 24, 1967   7 Sheets-Sheet 1

INVENTORS.
RALPH M. RIDDLE, JR. &
JAMES H. HUFFORD
BY
*Meyer, Tilberry & Body*
ATTORNEYS April 14, 1970  R. M. RIDDLE, JR., ET AL  3,506,808
VOLUME-OCCUPANCY CONTROL OF TRAFFIC FLOW
Filed March 24, 1967  7 Sheets-Sheet 2

INVENTORS.
RALPH M. RIDDLE, JR. &
JAMES H. HUFFORD
BY
Meyer, Tilberry & Body
ATTORNEYS April 14, 1970  R. M. RIDDLE, JR., ET AL  3,506,808
VOLUME-OCCUPANCY CONTROL OF TRAFFIC FLOW
Filed March 24, 1967  7 Sheets-Sheet 3

INVENTORS.
RALPH M. RIDDLE, JR. &
JAMES H. HUFFORD
BY
Meyer, Tilberry & Body
ATTORNEYS

FIG. 4

April 14, 1970 R. M. RIDDLE, JR., ET AL 3,506,808
VOLUME-OCCUPANCY CONTROL OF TRAFFIC FLOW
Filed March 24, 1967 7 Sheets-Sheet 6

FIG. 9

INVENTORS.
RALPH M. RIDDLE, JR. &
JAMES H. HUFFORD
BY
Meyer, Tilberry & Body
ATTORNEYS United States Patent Office 3,506,808
Patented Apr. 14, 1970

3,506,808
VOLUME-OCCUPANCY CONTROL OF TRAFFIC FLOW
Ralph M. Riddle, Jr., and James H. Hufford, Moline, Ill., assignors to E. W. Bliss Company, Canton, Ohio, a corporation of Delaware
Filed Mar. 24, 1967, Ser. No. 625,742
Int. Cl. G08g 1/07; G06g 7/12
U.S. Cl. 235—150.24                                18 Claims

ABSTRACT OF THE DISCLOSURE

A traffic control apparatus which includes volume and occupancy computers for developing traffic volume and traffic occupancy level signals. A combining device serves to combine these signals and provide a volume-occupancy level signal. A traffic function selector receives the volume-occupancy level signal to control such traffic functions as cycle length, offset and split. A stoppage detector serves, when the volume-occupancy level signal is greater than a given value, to stop the computing function by the computers and a detector transfer circuit serves under these conditions to substitute a secondary traffic detector for a primary traffic detector coupled to the computers.

This invention relates to the art of traffic control and, more particularly, to a system for controlling traffic flow based on a combination of traffic volume and occupancy levels.

The invention is particularly applicable in conjunction with controlling such traffic functions as cycle length, split and offset, and will be described with particular reference thereto; although, it is to be appreciated that the invention has other applications in the art of traffic control, such as for controlling lane allocation in a reversible lane roadway control system.

Until recently, traffic adjusted control systems have normally used traffic volume sampling as a means of determining traffic variations and demands. Traffic volume sampling is a measure of traffic quantity; that is, the number of vehicles passing a given point in a unit of time. Traffic volume measurements do not take into effect the quality of the traffic flow, where quality is considered as a measure of traffic congestion. It is known that when heavy congestion sets in, the level traffic volume may decrease and actually approach a zero level when all traffic is stopped. A traffic adjusted controller not having any way to determine between a drop in volume due to heavy congestion, or a drop in volume due to lack of traffic demand, would immediately call for a timing and program change for light traffic, when in reality this system may be choked with heavy traffic.

A recent measure of traffic characteristics has been introduced and called "Lane Occupancy." This is the measure of the time that a point of roadway is occupied by vehicles with respect to total time. For instance, if a point of a roadway is covered by vehicles for sixty seconds out of a four minute sampling period, the lane occupancy is 25% for that four minute sampling period. Lane occupancy, then, becomes a measure of traffic quality, or a relative measure of traffic congestion. Lane occupancy can be varied from 0% when there are no cars over the sampling point during the sampling period, to substantially 100% when bumper to bumper traffic congestion occurs over the sampling point during the sampling period.

During recent studies, collected data has indicated that with traffic running normal, the lane occupancy on an expressway may be around 15%. When the traffic becomes congested, the lane occupancy may increase to a value on the order of 25%, and complete breakdown of traffic flow may occur when the lane occupancy level rises to a value on the order of 40%. Also, it has been found from recent studies of urban arterials that lane occupancy may vary only from 4% to 5%, with varying traffic volumes during normal traffic conditions. Large variations in lane occupancy may occur as traffic flow changes from normal flow to congested flow.

If lane occupancy data alone is used for timing and programming changes of traffic control systems, it may not give the desired changes required for control use until actual traffic congestion sets in. Traffic volume data, on the other hand, has the desired changes to indicate increasing or decreasing traffic demand, but does not have the capability of determining the quality of the traffic flow, and it can create false data during congested conditions. From the foregoing it will be noted that the capabilities and faults of both types of data offset each other, and a combination of the data would give desired control data for an efficient traffic adjusted control system.

The present invention is directed toward traffic control apparatus for combining lane occupancy data as well as volume data, so that the combined data provides a more accurate basis on which to control traffic function selector devices for purposes of controlling such traffic functions as cycle length, split and offset.

In accordance with the present invention, the traffic control apparatus compriser first means, such as a traffic volume computer, for providing a volume level signal representative of the level of traffic volume in a first direction of traffic flow; second means, such as an occupancy level computer, for providing an occupany level signal representative of the level of traffic occupancy in the first direction of traffic flow; signal combining means coupled to the outputs of both the first and second means for providing a combined volume-occupancy level signal representative of a particular combination of the traffic volume level and the traffic occupancy level in the first direction of traffic flow; and, traffic function selector control circuit means, such as circuitry for control of cycle length, offset, split or lane allocation, for control of at least one local traffic signal controller and coupled to the combining means so as to be controlled thereby.

In accordance with a more limited aspect of the present invention, the first and second means are respectively analog volume level computing means and analog occupancy level computing means for developing analog voltages respectively representative of the traffic volume level, as well as the traffic occupancy level, and that the signal combining means is a summing means having an analog voltage output of a value proportional to the combined values of the output analog voltages of the two computing means.

In accordance with a still further aspect of the present invention, there is provided a stoppage detector circuit for actuating the computers to a holding condition when the volume-occupancy level attains a predetermined value.

In accordance with a still further aspect of the present invention, the output of the stoppage detector circuit is applied to a detector transfer circuit for disabling a primary traffic detector associated with the computers and substituting therefor a secondary traffic detector.

In accordance with a still further aspect of the present invention, there is provided an improved level selector for a cycle length control apparatus.

In accordance with a still further aspect of the present invention, there is provided improved offset and split selector circuits for controlling split and offset traffic functions.

The primary object of the present invention is to provide apparatus for controlling traffic flow based on a combination of traffic volume and traffic occupancy data.

A still further object of the present invention is to provide apparatus for controlling such traffic functions as cycle length, offset, split and lane allocation based on a particular combination of volume and occupancy levels of traffic flow.

A still further object of the present invention is to provide traffic control apparatus employing solid state means for economy of manufacture and operation.

A still further object of the present invention is to provide improved circuitry for controlling such traffic functions as cycle length, offset and split.

The foregoing objects and advantages of the invention will become apparent from the following description of the preferred embodiment of the invention as described in conjunction with the accompanying drawings in which:

GENERAL DESCRIPTION

Figure 1:
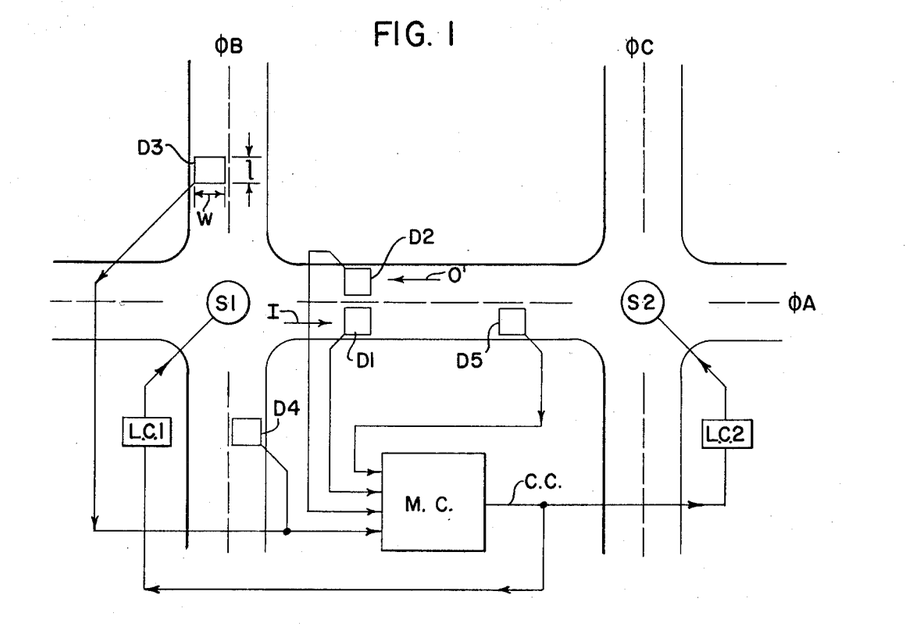
FIGURE 1 is a schematic illustration of an application of the invention.

Referring now to the drawings and more particularly to FIGURE 1, there is illustrated a typical traffic network including a main street, phase A, and two intersecting cross streets, phases B and C. Phase A includes at least one detector D1 or D5 for detecting vehicles in the inbound direction I of phase A. Also, phase A includes at least one detector D2 for detecting vehicles in the outbound direction O of phase A. Phase B includes detectors D3 and D4 located in opposing approaches to the intersection with phase A for detecting vehicles in phase B. Detectors D1, D2, D3, D4 and D5 preferably take the form of loop detectors, which are well known in the art of traffic control, and generally comprise a closed wire loop embedded in a roadway, with the loop configuration defining an area under surveillance by the detector, which together with associated circuitry develops an output signal so long as a vehicle is present within the area under surveillance. Alternatively, detectors D1, D2, D3, D4 and D5 may take the form of other detectors, such as overhead mounted ultrasonic detectors, which, in a manner similar to that of loop detectors, serve to monitor or survey a predetermined area on the roadbed for the presence of vehicles, and provide an output signal so long as a vehicle is present in the area under surveillance. In some applications, particularly with respect to use in conjunction with a volume level computer, to be described hereinafter, the detectors may take the form of spot detectors, such as the familiar treadle pad, which together with its associated circuitry provides an output signal in response to each actuation by a vehicle momentarily passing over the detector. In the event that the detectors take the form of loop detectors, as shown in FIGURE 1, it is preferable that each detector, as illustrated with respect to detector D3, have a width $w$ which is sufficiently wide to detect vehicles in at least one lane in the approach to the intersection, and a length $l$ which extends in the direction of the phase for a distance less than the length of one vehicle, such as, for example, on the order of four feet. The detectors D1, D2, D3, D4 and D5 are connected to a master controller MC which is interconnected by a connecting cable CC with local controllers LC1 and LC2 for controlling such traffic functions as cycle length, split and offset.

Figure 2:
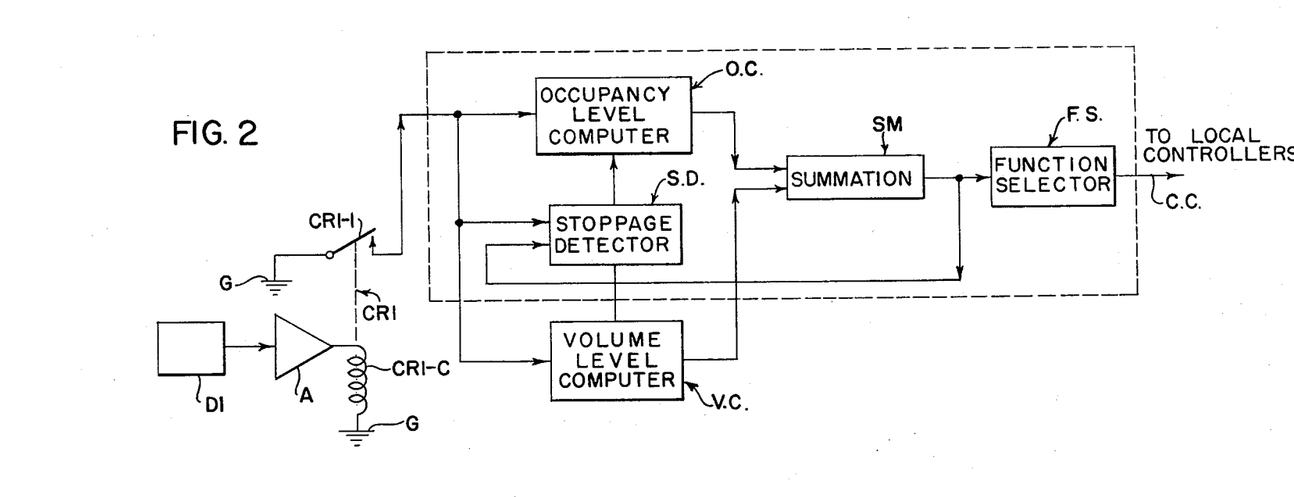
FIGURE 2 is a block diagram illustrating the preferred embodiment of the invention.

The loop detectors D1, D2, D3, D4 and D5 in FIGURE 1, together with their associated circuitry, preferably take the form as shown in FIGURE 2 with respect to detector D1, which is connected to an amplifier A and thence to ground through relay coil CR1-C of a relay CR1. Relay CR1 also includes a pair of normally open relay contacts CR1-1 having a movable contact connected to ground G and a stationary contact connected to the inputs of an occupancy level computer OC, a stoppage detector SD and a volume level computer VC, all located within the master controller MC. Computers OC and VC may take various forms, such as digital or analog computers, although they preferably are analog computers, as will be described hereinafter. The occupancy level computer OC serves to develop an analog voltage output signal representative of the time that the zone of roadway under surveillance by detector D1 is occupied by vehicles with respect to total time. The volume level computer VC serves to provide an analog voltage output signal representative of the number of vehicles detected by detector D1 in a unit of time. The outputs of computers OC and VC are applied to a summation device SM where their outputs are summed to obtain a combined volume-occupancy level analog voltage signal. In accordance with the invention, however, the outputs OC and VC are combined but not necessarily summed as is described herein with respect to the preferred embodiment of the invention. The output of the summation device SM is coupled to the input of a stoppage detector SD. The stoppage detector SD serves to detect a stoppage of traffic flow and apply signals to the occupancy level computer OC and the volume level computer VC to maintain the levels of their developed output signals at their current levels until traffic flow commences. The output of the summation device SM is applied to a function selector FS which serves to select the correct cycle length, split or offset traffic function and applies this information to the local controllers through the interconnecting cable CC.

Figure 3:
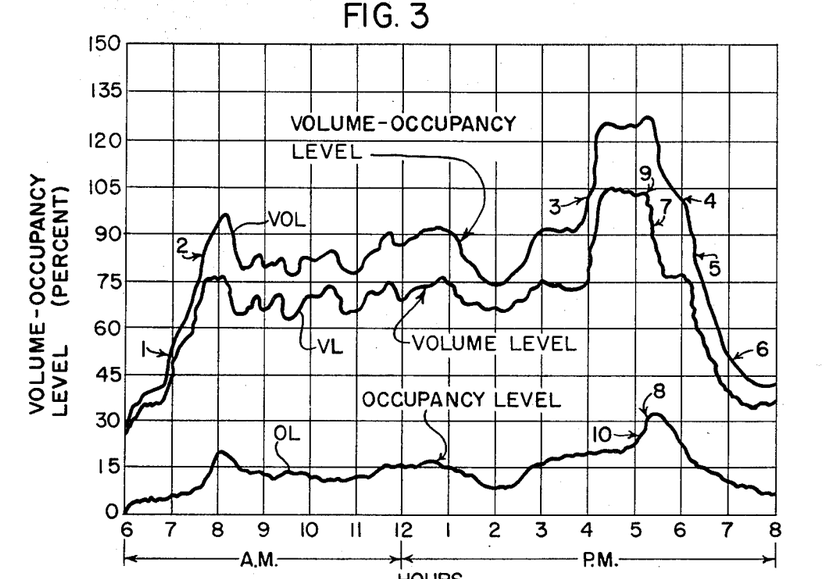
FIGURE 3 is a graphical illustration of typical volume and occupany level curves, as well as a combined volume-occupancy curve.

Reference is now made to FIGURE 3 which shows typical occupancy level and volume level curves OL and VL together with a combined volume-occupancy level curve VOL as depicted, for example, for an urban arterial. With reference to the volume-occupancy level curve VOL, a system might transfer from off-peak free operation in a three dial, free system to cycle 1, coordinated operation at point 1 on the curve; a transfer to cycle 2 might occur at point 2 and a transfer to cycle 3 at point 3. The system would transfer back to cycle 2 at point 4 and to cycle 1 at point 5, and to free noncoordination operation at point 6. If volume data alone was being used, it would indicate a change from cycle 3 to cycle 2 in the region of point 7 on the volume level curve VL. This would be a false indication because the traffic is near its peak congestion point, point 8, on the occupancy level curve OL. Point 9 on the volume level curve VL is the critical volume point and is also the point of the most rapid increase in occupany level (congestion), at point 10 on the occupancy level curve OL. The combined volume-occupancy level curve VOL does not represent false data, and permits a system to institute the correct program to meet the actual traffic demand.

OCCUPANCY LEVEL COMPUTER

Figure 4:
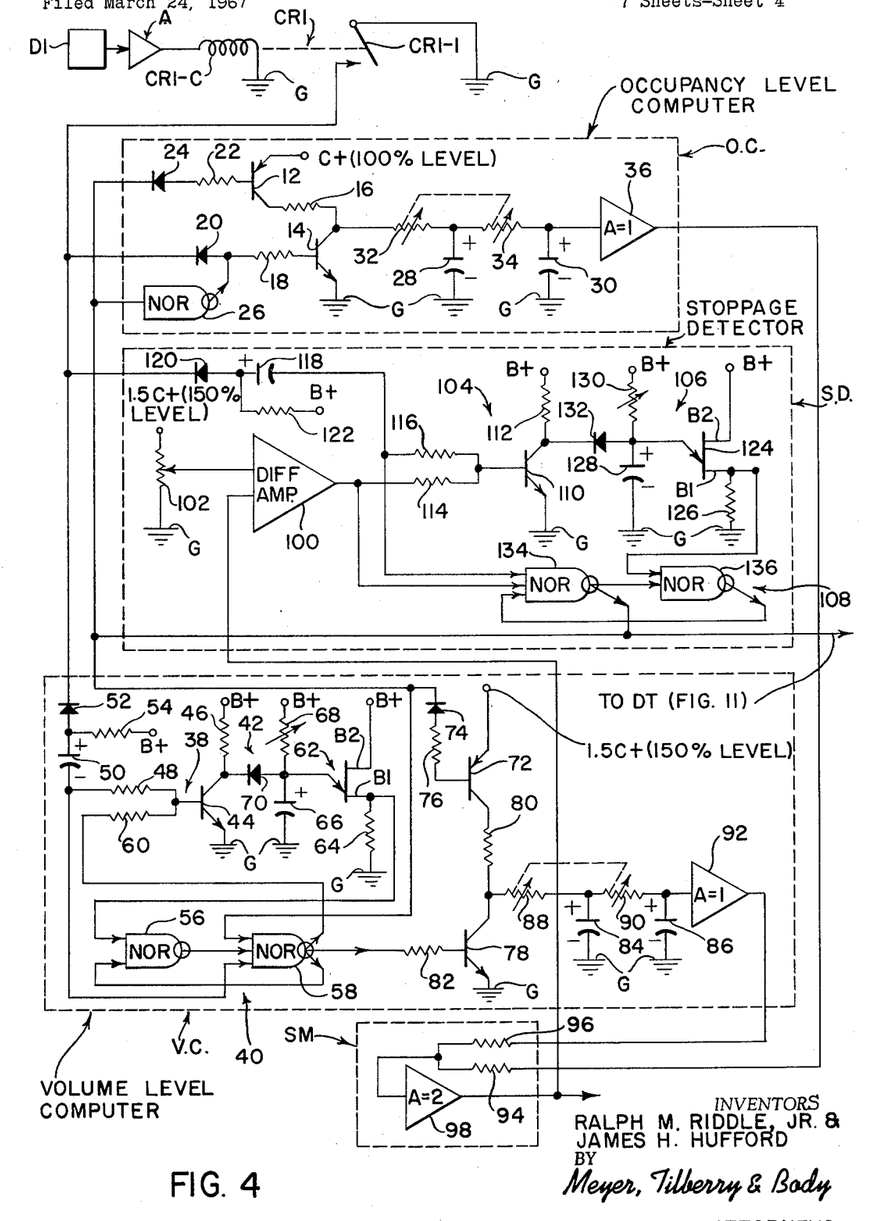
FIGURE 4 is a schematic circuit illustration of a portion of the embodiment shown in FIGURE 2.

The occupancy level computer OC is schematically illustrated in FIGURE 4, and includes a normally conductive PNP transistor 12 having its emitter to collector circuit connected in series with the collector to emitter circuit of a normally nonconductive NPN transistor 14. The emitter of transistor 12 is connected to a C+ direct current voltage source which, for example, may be on the order of four volts positive. This is representative of 100% level, with reference to the graph of FIGURE 3. The collector of transistor 12 is connected to the collector of transistor 14 through a resistor 16. The emitter of transistor 14 is connected to ground G. The base of transistor 14 is connected through a resistor 18, the anode-cathode circuit of a diode 20, poled as shown in FIGURE 4, and thence to the stationary contact of normally open relay contact CR1-1. The base of transistor 12 is connected through resistor 22 and the anode-cathode circuit of a diode 24, pole as shown in FIGURE 4, to an output circuit of stoppage detector SD. As will be explained in greater detail hereinafter with respect to the stoppage detector SD, the circuit connected with the cathode of diode 24 is normally at ground potential so that transistor 12 is normally forward biased. The computer OC also includes a NOR circuit 26 having its input circuit connected to the cathode of the diode 24, and its output circuit connected to the junction of resistor 18 and the anode of diode 20. NOR circuit 26 serves to apply a binary "1" signal, i.e., a positive direct current voltage signal, to the base of transistor 14 so long as a binary "0" signal, i.e., a ground potential signal, is applied to the input circuit of NOR circuit 26. Thus, transistor 14 is normally forward biased.

A pair of parallelly connected capacitors 28 and 30 are connected across the collector to emitter circuit of transistor 14. More particularly, capacitor 28 is connected between ground G and the collector of transistor 14 through a variable resistor 32. Capacitor 30 is connected between ground G and the positive side of capacitor 28 through a second variable resistor 34. The positive side of capacitor 30, in turn, is connected to the input circuit of an amplifier 36, having a gain of one. The output circuit of the amplifier is connected to the summation device SM.

In operation, as long as a vehicle is located within the zone of surveillance of loop detector D1, relay contacts CR1-1 are closed, thereby placing ground potential on the cathode of diode 20 in the occupancy level computer OC. This reverse biases transistor 14, thereby removing the previous short circuit across capacitors 28 and 30. Now current flows from the C+ voltage supply source through the emitter to collector circuit of transistor 12, and thence through resistor 16 to charge capacitors 28 and 30. The amplifier 36 preferably exhibits a high input impedance so that the capacitors 28 and 30 do not discharge through the amplifier, but that the average voltage stored by the capacitors is reflected through the amplifier to its output circuit for application to the summation device SM. Thus, the magnitude of the output potential signal from the computer OC is an analog representation, on a moving average basis, of the percent of time that a vehicle is located within the zone of surveillance of detector D1.

VOLUME LEVEL COMPUTER

The volume level computer VC is schematically illustrated in FIGURE 4, and includes an RLT NOR circuit 38, a bistable multivibrator circuit 40 and a unijunction transistor RC relaxation oscillator circuit 42. NOR circuit 38 includes an NPN transistor 44 having its collector connected through a resistor 46 to a B+ voltage supply source and its emitter connected to ground G. The base of transistor 44 is connected through a resistor 48, a capacitor 50, the anode to cathode circuit of a diode 52, poled as shown in FIGURE 4, to the stationary contact of normally open relay contacts CR1-1. The junction of the anode of diode 52 and the positive side of capacitor 50 is connected through a resistor 54 to a B+ voltage supply source.

The bistable multivibrator circuit 40 includes two NOR circuits 56 and 58, each of which preferably takes the form as NOR circuit 38. In fact, all NOR circuits disclosed herein preferably take the form as shown with respect to NOR circuit 38. NOR circuits 56 and 58 are connected together to define a bistable multivibrator circuit. In addition, one of the outputs of NOR circuit 58 is connected through a resistor 60 to the base of transistor 44. The junction of resistor 48 and the negative side of capacitor 50 is connected to the input circuit of NOR circuit 58, and another input circuit of NOR circuit 58 is connected to the output circuit of stoppage detector SD, in the same manner as the cathode of diode 24 in computer OC is connected to the output circuit of stoppage detector SD. As discussed previously, the output circuit of stoppage detector SD normally applies a ground potential to these circuits.

The unijunction transistor relaxation oscillator circuit 42 includes a unijunction transistor 62 having its base B2 connected to a B+ voltage supply source and its base B1 connected through a load resistor 64 to ground G, as well as to an input circuit of NOR circuit 56. A timing capacitor 66 is connected between the emitter of transistor 62 and ground G. The positive side of capacitor 66 is also connected through a variable timing resistor 68 to a B+ voltage supply source. The positive side of capacitor 66 is also connected to the collector of transistor 44 through the anode to cathode circuit of a diode 70, poled as shown in FIGURE 4.

The output circuit of the stoppage detector SD, which is connected to the input circuit of NOR circuit 58, is also connected to the base of a PNP transistor 72, through the cathode to anode circuit of a diode 74, poled as shown in FIGURE 4, and a resistor 76. The emitter to collector circuit of transistor 72 is connected in series with the collector to emitter circuit of an NPN transistor 78 through a series resistor 80. Transistor 78 has its emitter connected to ground and its base connected through a resistor 82 to the output circuit of NOR circuit 58 of the bistable multivibrator circuit 40. The emitter of transistor 72 is connected to a 1.5 C+ voltage supply source representative of 150% level with reference to the graph of FIGURE 3. A pair of capacitors 84 and 86 are connected in parallel with the collector-emitter circuit of transistor 78. More particularly, capacitor 78 is connected between ground and the collector of transistor 78 through a variable resistor 88. Also, capacitor 86 is connected between ground and the positive side of capacitor 84 through a second variable resistor 90. In addition, the positive side of capacitor 86 is connected to an amplifiers 92, having a gain of one and exhibiting a high input impedance so that the capacitors do not discharge through the amplifier, but that the average voltage stored by the capacitors is reflected through the amplifier to its output circuit. The output circuit of amplifier 92 is connected to the summing device SM.

In operation, prior to actuation of relay contacts CR1–1, transistors 72 and 78 are both forward biased and conductive, whereby a short circuit is provided across capacitors 84 and 86. More particularly, the base of transistor 72 is connected to the output circuit of the stoppage detector SD, which normally provides a ground potential signal for forward biasing transistor 72. Also, since the cathode of diode 74 is connected to the input circuit of NOR circuit 58, a binary "1" signal, i.e., a positive direct current voltage, is present on the output circuit of NOR circuit 58 and is applied as a forward biasing signal to the base of transistor 78. Also, the output circuit of NOR circuit 58 applies a binary "1" signal to the base of transistor 44 so that the transistor is normally conductive, providing a short circuit path for capacitor 66 and thereby preventing conduction of transistor 62. Since unijunction transistor 62 is normally non-conductive, and since transistors 56 and 58 are connected together as a bistable multivibrator circuit, the stable state condition of circuit 40 is such that a binary "1" signal is provided by its output circuit.

Whenever a vehicle enters the zone of influence of detector D1, a ground potential is applied through relay contacts CR1-1 to the cathode of diode 52. Thus, the positive side of capacitor 50 is referenced to ground potential. As the vehicle leaves the zone of influence of detector D1, the relay contacts CR1-1 open, whereupon the positive side of capacitor 50 is immediately referenced to a positive potential approaching the value of the B+ voltage supply source. Since, however, capacitor 50 cannot charge instantaneously, the potential on its negative side is also increased positively, in the same sense as that on the positive side of the capacitor, whereby a positive signal, i.e., a binary "1" signal pulse, is applied to the input circuit of NOR circuit 58 of the multivibrator circuit 40. This causes the multivibrator circuit to change its stable state so that its output circuit now provides binary "0" signals. Thus, transistor 78 becomes reversed biased, removing the short circuit across capacitors 84 and 86. So long as transistor 78 remains reversed biased, capacitors 84 and 86 charge toward the value of the 1.5 C+ voltage supply source by current flow through the emitter to collector circuit of transistor 72, in the same manner as capacitors 28 and 30 which are in the occupancy level computer OC. The average value of the stored voltage in capacitors 84 and 86 is reflected through amplifier 92 to the summation device SM.

When the stable state of multivibrator circuit 40 is changed, a binary "0" signal is also applied through resistor 60 to the base of transistor 44 of NOR circuit 38. Accordingly, transistor 44 becomes reversed biased, removing the short circuit across timing capacitor 66. This permits capacitor 66 to charge toward the value of the B+ voltage supply source by current flow through adjustable resistor 68. When the level of the voltage stored by capacitor 66 obtains a value equal to the peak point voltage of unijunction transistor 62, capacitor 66 discharges through the emitter to base B2 circuit of the transistor so that a positive pulse, i.e., a binary "1" signal pulse, is developed across load resistor 64. This binary "1" signal pulse is applied to the input circuit of NOR circuit 56, causing the bistable multivibrator circuit 40 to return to its original stable state. Accordingly, the output circuit of NOR circuit 58 now applies a binary "1" signal to the base of transistor 78, and thereby essentially short circuit capacitors 84 and 86.

In addition, a binary "1" signal is applied by the output circuit of NOR circuit 58 through resistor 60 to the base of transistor 44 of NOR circuit 38 to forward bias this transistor into condition, whereby timing capacitor 66 becomes short circuited to prevent further conduction of transistor 62. It will now be appreciated that since the volume level computer commences its operation when a vehicle leaves the area of surveillance of detector D1, the detector need not take the form of a presence detector, such as a loop detector, as shown in FIGURE 4, but may take the form of a spot detector, such as the familiar treadle pad.

SUMMING DEVICE AND STOPPAGE DETECTOR

The summing device SM takes the form of two parallel resistors 94 and 96 of equal resistance and which are respectively connected to the output circuits of occupancy level computer OC and the volume level computer VC. The voltage appearing at the junction of resistors 94 and 96 will be equal in magnitude to the average value of the magnitude of the analog output voltages appearing on the output circuits of amplifiers 36 and 92. The output of the summation device SM is applied through an amplifier 98 having a gain of two so that its output voltage will equal the summation of the output voltages appearing on the output circuits of amplifiers 36 and 92. As shown in FIGURE 2, the output of the summation device SM is applied to a function selector FS, the variations of which will be described in greater detail hereinafter, as well as to the input circuits of stoppage detector SD.

The stoppage detector SD is schematically illustrated in FIGURE 4 and includes a differential amplifier 100, having one input circuit connected to the output circuit of the summation device SM and a second input circuit connected to the wiper arm of a potentiometer 102 connected between ground and a 1.5 C+ voltage supply source, representative of 150% level with reference to the graph of FIGURE 3. A positive output signal, which may be referred to as a binary "1" signal, is present on the output circuit of amplifier 100 only when the magnitude of the reference voltage, taken between ground and the wiper arm of potentiometer 102, exceeds the magnitude of the output potential of the summation device SM. In addition to amplifier 100, the stoppage detector SD also includes an RLT NOR circuit 104, a unijunction transistor RC relaxation oscillator circuit 106 and a bistable multivibrator circuit 108.

NOR circuit 104 includes an NPN transistor 110 having its emitter connected to ground and its collector connected through a resistor 112 to a B+ voltage supply source. The base of transistor 110 is connected through a resistor 114 to the output circuit of amplifier 100, and through a second resistor 116 to the stationary contact of normally open relay contacts CR1-1, through a capacitor 118 and the anode to cathode circuit of a diode 120, poled as shown in FIGURE 4. The junction of the positive side of capacitor 118 and the anode of diode 120 is connected through a resistor 122 to a B+ voltage supply source.

The unijunction transistor RC relaxation oscillator circuit 106 includes a unijunction transistor 124 having its base B2 connected to a B+ voltage supply source and its base B1 connected to a load resistor 126 to ground G. A timing capacitor 128 is connected between ground G and a B+ voltage supply source, through a variable timing resistor 130. The junction of capacitor 128 and resistor 130 is connected to the emitter of transistor 124, as well as through the anode to cathode circuit of a diode 132, poled as shown in FIGURE 4, to the collector of transistor 110.

The bistable multivibrator circuit 108 includes two NOR circuits 134 and 136 connected together to define a bistable multivibrator. In addition, two input circuits of NOR circuit 134 are respectively connected to the junctions of resistor 116 and capacitor 118, and to the junction of resistor 114 and amplifier 100. The input circuit of NOR circuit 136 is connected to the base B1 of transistor 124. The output of the stoppage detector SD is taken from the output circuit of NOR circuit 134 and is normally at ground potential and is connected to the cathode of diode 74 in the volume level computer VC, as well as to the cathode of diode 24 in the occupancy level computer OC. In addition, this output may also be connected to an automatic detector changing circuit, to be described in greater detail hereinafter with reference to FIGURE 11.

The stoppage detector SD serves to stop the computing functions of the occupancy level computer OC and the volume level computer VC at such time as the output potential of summation device SM is greater than the potential on the wiper arm of potentiometer 102, and if the time gap between succeeding vehicles passing over detector D1 exceeds a predetermined period of time. The setting of the tap on potentiometer 102 is representative of a volume plus occupancy level above which infrequent closure of detector relay contacts CR1–1 would indicate that a breakdown in traffic flow is taking place. The adjustment of the timer circuit, in the form of unijunction transistor RC relaxation oscillator 106, is set at a value indicative of a maximum allowable time interval between successive closures of detector relay contacts CR1–1.

Normally, the value of the output potential signal of summation device SM is less than the potential on the tap of potentiometer 102, whereby the positive output signal, i.e., a binary "1" signal, is present on the output circuit of amplifier 100. This signal serves to forward bias transistor 110 and thereby provide a short circuit for capacitor 128. Also, a binary "1" signal is applied to the input circuit of NOR circuit 134 so that the output circuit of NOR circuit 134 applies a binary "0" signal, i.e., a ground potential signal, to the cathode of diode 124, as well as to the cathode to diode 74 to maintain the occupancy level computer OC and the volume level computer VC in operating condition. This state of the bistable multivibrator circuit 108 is maintained stable since a binary "1" signal is applied from the output circuit of NOR circuit 136 to the input circuit of NOR circuit 134.

If the output potential signal of the summation device SM is greater than the potential on the tap of potentiometer 102, a ground potential signal, i.e., a binary "0" signal, is present on the output circuit of differential amplifier 100 to reverse bias transistor 110, thereby removing the short circuit across capacitor 128. Thus, the timing circuit will commence its timing function by charging capacitor 128 toward the level of the B+ voltage supply source. The bistable multivibrator circuit 108 will not change its state since although a binary "0" signal is now applied to one of the input circuits of NOR circuit 134, there is still a binary "1" signal applied thereto from the output circuit of NOR circuit 136. In the absence of a vehicle detection, the voltage stored by capacitor 128 will eventually attain a level equal to the peak point voltage of unijunction transistor 124, whereupon the capacitor will discharge through the emitter to base B1 circuit of the transistor, and develop a positive potential across load resistor 126. This positive potential will serve as a binary "1" signal for application to the input circuit of NOR circuit 136 to thereby change the stable state of memory circuit 108. Accordingly, the output circuit of NOR circuit 134 now applies a binary "1" signal at its output circuit to the cathode of diode 24 in occupancy level computer OC, as well as to the cathode of diode 74 in the volume level computer VC. This reverse biases transistors 12 and 72 in those computers. A binary "1" signal is also applied to the input circuit of NOR circuit 26, whereupon the output circuit thereof applies a reverse biasing binary "0" signal to the base of transistor 14 to thereby reverse bias this transistor. Accordingly, capacitors 28 and 30 will maintain their charged levels since they cannot discharge through transistor 14. Similarly, a binary "1" signal is applied to the input circuit of NOR circuit 58 in computer VC, whereupon a binary "0" signal is applied to the base of transistor 78 to reverse bias this transistor preventing capacitors 84 and 86 from discharging. In this manner, computers OC and VC will stop their computing functions and hold their analog voltage outputs at their present values until the binary "1" signal from the output circuit of NOR circuit 134 of stopage detector SD is removed.

If a vehicle detection occurs before the level of the voltage stored in capacitor 128 reaches the peak point voltage of unijunction transistor 124, the timing circuit will be reset whereupon no binary "1" signal will be applied from the output circuit of the stoppage detector SD to the computers OC and VC. More particularly, as a vehicle enters a zone of influence of loop detector D1, relay contacts CR1–1 will close, applying ground potential to the cathode of diode 120 in the stoppage detector SD. Accordingly, the junction of the anode of diode 120 and the positive side of capacitor 118 will be referenced to ground potential. As soon as the vehicle leaves the area of surveillance of detector D1, the ground potential signal is momentarily lost and the junction of the anode of diode 120 and the positive side of capacitor 118 is initially raised toward a potential approaching that of B+ voltage supply source. Since the capacitor cannot charge instantaneously, the potential on the negative side of the capacitor will also momentarily change in a positive direction in the same amount as occurred on the positive side of the capacitor. This serves to apply a binary "1" signal pulse through resistor 116 to the base of transistor 110. Accordingly, transistor 110 becomes forward biased, whereupon capacitor 128 discharges through diode 132 and through the collector to emitter circuit of transistor 110 to ground G. Thus capacitor 128 must again commence charging before it can discharge through unijunction transistor 128 to change the stable state of bistable multivibrator circuit 108. If a succeeding vehicle actuates relay contact CR1–1 before capacitor 128 can charge to the level of the peak point voltage level of transistor 124, transistor 110 will again be forward biased and the capacitor will discharge so as to reset the circuit. As the volume-occupancy level of traffic flow begins to decrease, the output voltage of the summation device SM will decrease and eventually be less than the value set on the tap of potentiometer 102, whereupon a steady state binary "1" signal is applied from the output of amplifier 100 to maintain transistor 110 forward biased and thereby maintain timing capacitor 128 short circuited.

CYCLE LENGTH SELECTOR

Figure 5:
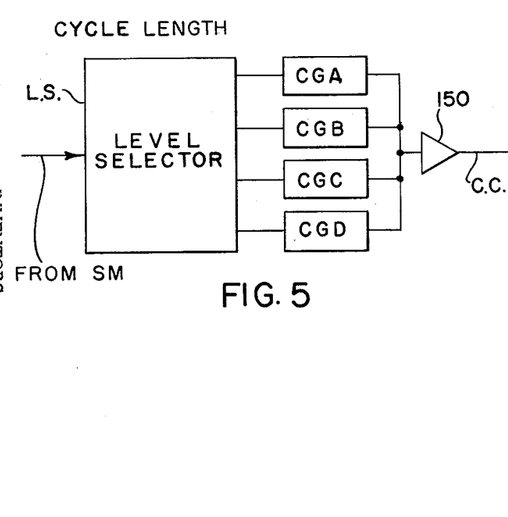
FIGURE 5 is a block diagram illustrating an application of the invention for controlling traffic cycle lengths.

As discussed previously with respect to FIGURE 2, the output of the summation device SM is applied to a function selector FS which, through its interconnection with the local controllers by the interconnecting cable CC, serves to control such traffic functions as cycle length, offset and split. The function selector FS may take the form of a cycle length selector, such as that disclosed in the patent to G. D. Hendricks 3,120,651, assigned to the same assignee as the present invention. Briefly, such a cycle length selector may take the form as shown in FIGURE 5 wherein the input of the level selector LS is connected to the output of the summation device SM, shown in FIGURE 2. The level selector LS has four output circuits, only one of which is energized in accordance with the level of the analog volume-occupancy potential signal applied to the input of the level selector. These four outputs are respectively coupled to cycle generators CGA, CGB, CGC and CGD, which, in turn, have their outputs connected together in common through an amplifier 150 to interconnecting cable CC connected to the local controllers LC1 and LC2. The cycle generators CGA through CGD may take various forms, such as that shown in Patent No. 3,047,838, wherein each generator serves, when its circuit is energized, to provide at its output circuit a signal of a different fixed frequency for transmission through the interconnecting cables CC to the local controllers, each having a synchronous motor with the speed being controlled in accordance with the frequency of the received signal. In this manner, each local controller will have a cycle length which is inversely related to the frequency of the received signal. Thus, cycle length No. 1, cycle length No. 2, cycle length No. 3 and cycle length No. 4 may be respectively called for by generators CGA, CGB, CGC and CGD.

Figure 6:
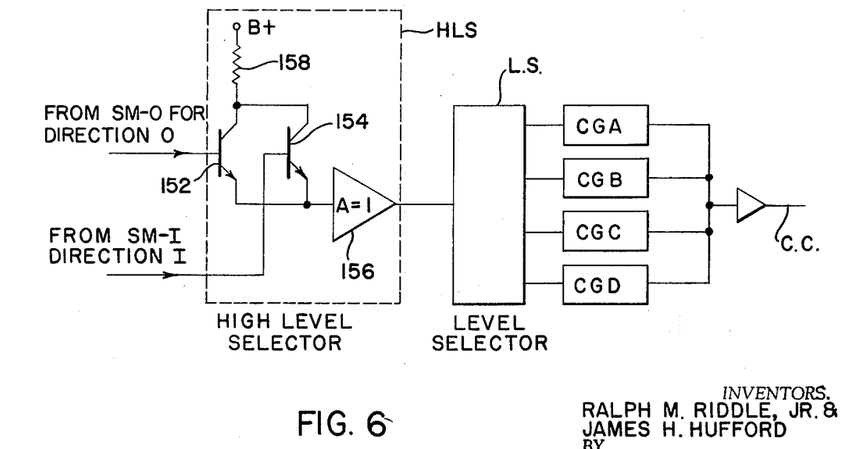
FIGURE 6 is a combined schematic circuit block diagram illustrating a portion of a cycle length selector control circuit.

It may be desirable that the cycle length selection be dependent upon the higher of the volume-occupancy level of traffic flow detected in various directions along a thoroughfare. Thus, for example with reference to FIGURE 1, detector D1 serves to detect traffic flow in the inbound direction I, whereas detector D2 serves to detect traffic flow in the outbound direction O. The master controller MC includes a circuit, as shown in FIGURE 2, associated with each detector D1 and D2 so that analog output signals of the volume-occupancy level is computed both for the inbound direction I and the outbound direction O. When it is desired that the cycle length of operation of controllers LC1 and LC2 for controlling traffic signals S1 and S2 be made dependent on the greater of the volume-occupancy levels of traffic flow in directions I and O, then a high level selector HLS, as shown in FIGURE 6, is used. As shown in FIGURE 6, the high level selector HLS includes two inputs, one taken from the output of a summation device SM–O, constructed in accordance with that described in FIGURES 2 and 4, and which serves to provide a volume-occupancy level analog voltage signal for traffic flow in direction O. The other input for the high level selector HLS is taken from a summation device SM–I, also constructed in accordance with that shown in FIGURES 2 and 4, and which serves to provide a volume-occupancy level analog voltage signal for traffic flow in direction I. The high level selector HLS includes a pair of NPN transistors 152 and 154 having their emitters connected together in common to an amplifier 156 exhibiting a gain of one and, in turn, having its output connected to the input of level selector LS. The collectors of transistors 152 and 154 are connected together in common and thence through a resistor 158 to a B+ voltage supply source. The base of transistor 152 is connected to the output of summation SM–O and the base of transistor 154 is connected to the output of summation device SM–I. Accordingly, if the output voltage of summation device SM–O is greater than that from summation device SM–I, transistor 152 will be more heavily forward biased than will transistor 154, whereupon the heavier conduction of transistor 152 will tend to reverse bias transistor 154. Accordingly, the input to the level selector will see only the output of the summation device SM–O. Similarly, if the output voltage of summation device SM–I is greater than that of the summation device SM–O, the converse will be true and the input of the level selector will see only the output of summation device SM–I.

PREFERRED LEVEL SELECTOR

Figure 7:
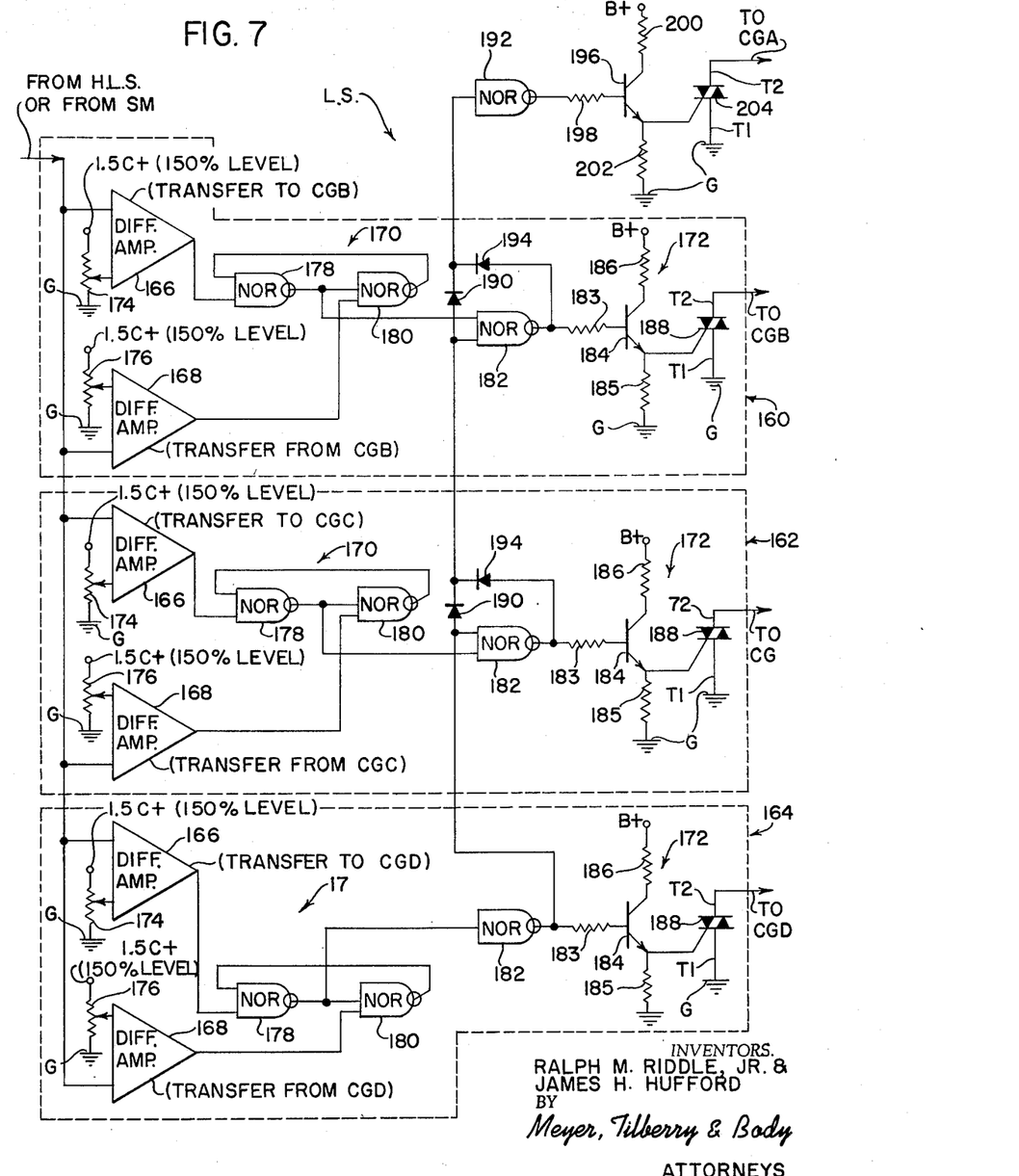
FIGURE 7 is a combined schematic block diagram illustration of a level selector for use in a cycle length selector.

Although the level selector may take the form as shown in Patent No. 3,047,838, as discussed hereinabove, the level selector LS preferably takes the form as shown in FIGURE 7. Level selector LS has a common input which is taken from the output of the high level selector HLS, in the event that sampling for cycle length is made for more than one direction of traffic flow, or may be taken directly from a summation device SM, as shown in FIGURES 2 and 4, if sampling is made in only one direction of traffic flow. The level selector for providing four different cycle length determining signals includes four outputs respectively connected to cycle generators CGA, CGB, CGC and CGD, shown in FIGURES 5 and 6. Also, the level selector includes three level selecting circuits 160, 162 and 164, i.e., one less than the total number of outputs from the level selector. Level selector circuits 160, 162 and 164 are each substantially the same and, accordingly, only circuit 160 will be hereinafter described in detail with like components in each circuit being identified with like character references.

Level selector circuit 160 includes a pair of differential amplifiers 166 and 168, a bistable multivibrator circuit 170 and an AC static switch control circuit 172. Differential amplifiers 166 and 168 each include two inputs, one being directly connected to the common input of the level selector and the other being connected to the tap of a potentiometer. Thus, differential amplifier 166 has one input connected to the tap of a potentiometer 174 connected between ground and a 1.5 C+ voltage supply source, representative of 150% level with respect to the graph shown in FIGURE 3. Similarly, one of the inputs of differential amplifier 168 is connected to a tap of a potentiometer 176, connected between ground and the 1.5 C+ voltage supply source. The bistable multivibrator circuit 170 includes two RLT NOR circuits 178 and 180 which are connected together to define a bistable multivibrator circuit. The output of differential amplifier 166 is connected to the input circuit of NOR circuit 178 and the output circuit of differential amplifier 168 is connected to the input circuit of NOR circuit 180. The output of NOR circuit 178 is connected to the input of a NOR circuit 182, having its output connected to the AC static switch control circuit 172. More particularly, circuit 172 includes an NPN transistor 184, having its emitter connected to ground G and its collector connected to a B+ voltage supply source through a resistor 186. The base of transistor 184 is connected to the output circuit of NOR circut 182 through a resistor 183. The emitter of transistor 184 is connected to the gate of a triac 188, having its terminal T1 connected to ground G and its terminal T2 connected to cycle generator CGB so that when the triac is gated into conduction it may switch alternating current voltage.

A second input of NOR circuit 182 is connected through the anode-cathode circuit of a diode 190, poled as shown in FIGURE 7, to an input circuit of a NOR circuit 192. Also, the output circuit of NOR circuit 182 is connected through the anode-cathode circuit of a diode 194, poled as shown in FIGURE 7, to the junction of the cathode of diode 190 and the input circuit of NOR circuit 192. These two diodes are omitted from circuit 164.

NOR circuit 192 has its output circuit connected to the base of an NPN transistor 196 through a resistor 198. Transistor 196 has its collector connected through a resistor 200 to a B+ voltage supply source, and its emitter connected through a resistor 202 to ground G. The emitter of transistor 196 is also connected to the gate of a triac 204, having its terminal T1 connected to ground G and its terminal T2 connected to cycle generator CGA.

The level selector LS is adjusted so that normally its output circuit leading to cycle generator CGA is energized, with the other three outputs being de-energized. As the level of the input voltage increases to succeedingly higher levels, the circuit of FIGURE 7 serves to de-energize the output of generator CGA and energize the output to generator CGB, then de-energize the output leading to generator CGB and energize the generator leading to generator CGC, and then de-energize the output to generator CGC and energize the output to generator CGD.

In each of the differential amplifiers 166 a ground signal, i.e., a binary "0" signal, is present at its output circuit so long as the value of the potential on the wiper arm of the associated potentiometer 174 is greater than the value of the input voltage to the level selector LS. Conversely, a positive direct current voltage, i.e., a binary "1" signal, is present on the output of each differential amplifier 166 whenever the value of the voltage applied to the input of the level selector LS is greater than the value of the voltage set on the wiper arm of the associated potentiometer 174. Also, a binary "1" signal is present on the output circuit of each differential amplifier 168 so long as the value of the potential on the wiper of its associated potentiometer 176 is greater than that of the input potential to the level selector; otherwise, a binary "0" signal is present on the output circuit of each differential amplifier 168. Potentiometers 174 associated with each differential amplifier 166 in circuits 160, 162 and 164 are set for increasing input voltages required for transferring energization from cycle generator CGA to CGB to CGC and to CGD. Potentiometers 176 associated with each differential amplifier 168 in circuits 160, 162 and 164 are set for decreasing input voltages for transfer of these generators. Thus, for purposes of illustration only, potentiometer 174 in circuit 160 is set so that when the value of the input voltage is 20% of the 1.5 C+ voltage supply source, differential amplifier 166 will change state to apply a binary "1" signal to NOR circuit 178, in circuit 160. In this same circuit 160, the setting of potentiometer 176 is such that differential amplifier 168 applies a binary "0" signal to NOR circuit 178 at values below 18%. Similarly, in circuit 162 differential amplifier 166 will transfer at 30% and differential amplifier 168 will transfer at 28%. Also, for example, in circuit 164, differential amplifier 166 will transfer at 40% and differential amplifier at 168 will transfer at 38%.

During light traffic conditions, i.e., below 18% level of volume-occupancy, differential amplifier 166, in circuit 160, applies a binary "0" signal to the input circuit of NOR circuit 178, whereupon its output circuit applies a binary "1" signal to NOR circuit 180. The output circuit of NOR circuit 180 applies a binary "0" signal to the input circuit of NOR circuit 178. Since a binary "1" signal is applied from the output circuit of NOR circuit 178 to the input circuit of NOR circuit 182, the output circuit of NOR circuit 182 applies a binary "0" signal to the base of transistor 184 to thereby reverse bias the transistor, preventing energization of the output circuit to cycle generator CGB. The output circuit of NOR circuit 182 also applies a binary "0" signal through diode 194 to the input circuit of NOR circuit 192. The output circuit of NOR circuit 192, in turn, applies a binary "1" signal to the base of transistor 196 to forward bias this transistor into conduction. Accordingly, a positive potential is developed across resistor 202 applying a forward biasing potential to the gate of triac 204 so that with an alternating current voltage source connected between terminals T1 and T2 the output to cycle generator CGA is energized. Thus, cycle generator CGA is operative so that its cycle length determining signal is used during light traffic flow conditions.

As the traffic flow increases to the point that the volume-occupancy level increases above 18%, the differential amplifier 168 in circuit 160 changes its state and applies a binary "0" signal to the input circuit of NOR circuit 180. However, since NOR circuit 178 applies a binary "1" signal to the input circuit of NOR circuit 180 so long as the level is below 20%, the stable state of multivibrator circuit 170 is not changed. But, when the level of traffic flow increases to the point that the volume-occupancy level is greater than 20%, differential amplifier 166 in circuit 160 applies a binary "1" signal to the input circuit of NOR circuit 178. This changes the stable state of multivibrator circuit 170, and the output circuit of NOR circuit 178 applies a binary "0" signal to the input circuit of NOR circuit 182. Thus, the output circuit of NOR circuit 182 now applies a binary "1" signal through diode 194 to the input circuit of NOR circuit 182. NOR circuit 192, now in turn, applies a binary "0" signal to the base of transistor 196 to reverse bias the transistor and remove the forward bias potential applied to the gate of triac 204. With the forward bias potential removed, the triac will not be latched into conduction during each half cycle of the alternating current voltage source and, accordingly, will no longer switch alternating current voltage across its terminals T1 and T2, whereby the output circuit to cycle generator CGA is de-energized.

The output circuit of NOR circuit 182 also applies a binary "1" signal through resistor 183 to the base of transistor 184. Thus, transistor 184 is baised into conduction so that a positive voltage developed across resistor 183 provides a forward biasing gating signal to the gate of triac 188 of circuit 160, whereupon the output circuit to cycle generator CGB is energized. Even if the traffic flow now falls slightly below 20%, but not below 18%, the output of circuit 160 to cycle generator CGD will remain energized. This is true since once the differential amplifier 166 detected a value greater than 20% so as to apply a binary "1" signal to NOR circuit 178, the multivibrator circuit 170 changed its stable state and the new stable state is maintained. However, if the level falls below 18%, differential amplifier 168 of circuit 160 will apply a binary "1" signal to the input circuit of NOR circuit 180 and this will change the stable state of multivibrator circuit 170 to its original condition, whereupon a binary "1" signal will be applied from the output circuit of NOR circuit 178 to the input circuit of NOR circuit 182. Thus, the output of NOR circuit 182 will apply a binary "0" signal to transistor 184 to de-energize the output circuit to cycle generator CGB and to NOR circuit 192 to energize the output circuit to cycle generator CGA. The operation of circuits 162 and 164 for energizing the output circuits to generators CGC and CGD is the same as just described with respect to circuit 160, and no further description is deemed necessary for a complete understanding of the invention.

OFFSET SELECTOR

Figure 8:
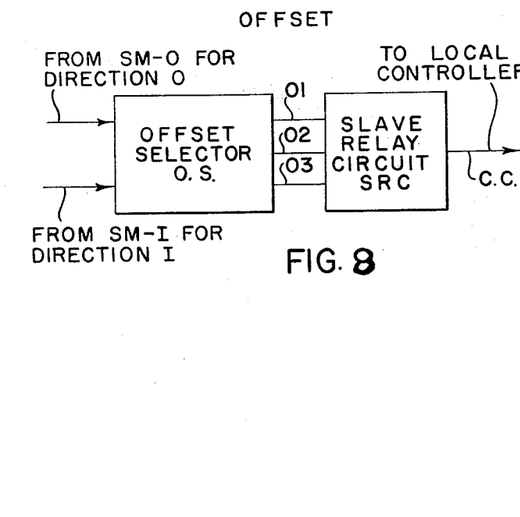
FIGURE 8 is a block diagram illustration of an offset selector.

As discussed previously, with respect to FIGURE 2, the output of the summation device SM is applied to a function selector FS, the output of which is connected to the local controllers through an interconnecting cable CC for purposes of controlling such traffic functions as cycle length, offset and split. The function selector FS may include a cycle length selector, as described hereinbefore with respect to FIGURES 5, 6 and 7, and/or an offset selector OS, as illustrated in FIGURE 8. The offset selector OS has two inputs, one connected to the output of a summation device SM–O coupled to associated volume and occupancy computers and a stoppage detector, all being constructed as illustrated in FIGURES 2 and 4, and connected to detector D2 (see FIGURE 1) for purposes of developing an analog voltage signal representative of the volume-occupancy level of traffic flow in the outbound direction O. Similarly, the other input of the offset selector OS is taken at the output of a second summation device SM–I coupled to associated volume and occupancy computers and a stoppage detector, all being constructed as illustrated in FIGURES 2 and 4, and connected to detector D1 (see FIGURE 1) for purposes of developing an analog signal representative of the volume-occupancy level of traffic flow in the inbound direction I. The offset selector OS has three outputs O1, O2 and O3 connected to a slave relay circuit SRC which, in turn, has its output connected to the local controllers through the interconnecting cable CC. If traffic is balanced in the inbound direction I and the outbound direction O, an average offset will be allocated to the traffic flow in phase A by energizing output O1. When the traffic flow in the inbound direction attains a certain relationship, to be described in greater detail hereinafter with respect to the traffic flow in the outbound direction, output O2 will be energized to provide an inbound preferential offset signal. Similarly, when the level of traffic flow in the outbound direction attains a certain relationship with respect to that in the inbound direction, output O3 is energized to provide an outbound preferential offset signal to the local controllers. Offset selector OS together with its associated slave relay circuit SCR may be constructed as shown in United States Patent No. 3,293,601, assigned to the same assignee as the present invention.

PREFERRED OFFSET SELECTOR

Figure 9:
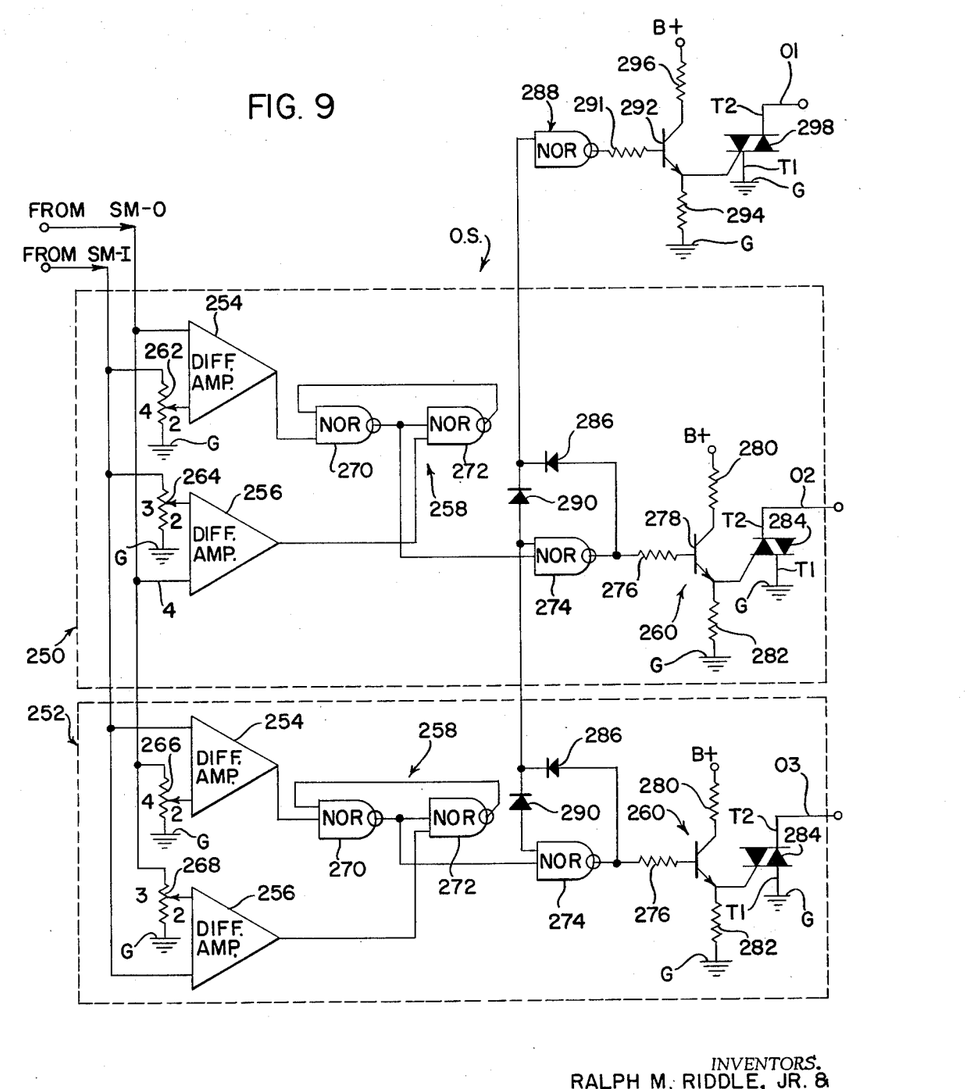
FIGURE 9 is a combined schematic circuit block diagram illustration of the internal circuitry within either the offset selector of FIGURE 7 or the split selector of FIGURE 10.

In accordance with the present invention, the offset selector OS takes the form as illustrated in FIGURE 9. The offset selector has two inputs, one taken from the output of summation device SM–O and the other taken from the output of summation device SM–I, and three outputs O1, O2 and O3 which are connected to the slave relay circuit SRC, as shown in FIGURE 8. In addition, the offset selector OS includes two control circuits 250 and 252, each of which includes substantially identical circuitry and, accordingly, only circuit 250 will be described in detail hereinafter, with like components in both circuits being identified with like character references.

Circuit 250 includes a pair of differential amplifiers 254 and 256, a bistable multivibrator circuit 258 and an AC static switch control circuit 260. Each differential amplifier has two inputs, one connected to a tap on a potentiometer and one connected directly to the output of either summation device SM–O or summation device SM-I. More particularly, in circuit 250, differential amplifier 254 has one input connected directly to the output of summation device SM-O and another input connected to a tap on a potentiometer 262, connected between ground G and the output of summation device SM-I. Also, in circuit 250, differential amplifier 256 has one input connected directly to the output of the summation device SM-O and its other input connected to a tap on a potentiometer 264, which is connected between ground G and the output of summation device SM-I. In circuit 252 differential amplifier 254 has one input directly connected to the output of summation device SM-I and its other input connected to a tap on a potentiometer 266, which is connected between ground G and the output of summation device SM-O. Also, in circuit 252, differential amplifier 256 has one of its inputs directly connected to the output of summation device SM-I and its other input connected to a tap on a potentiometer 268, connected between ground G and the output of summation device SM-O.

Bistable multivibrator circuit 256 includes two NOR circuits 270 and 272 connected together to define a bistable multivibrator circuit. The output of differential amplifier 254 is connected to the input of NOR circuit 270 and the output of differential amplifier 256 is connected to the input of NOR circuit 272. The output of NOR circuit 270 is connected to the input of a NOR circuit 274. NOR circuit 274 has its output connected through a resistor 276 to the base of NPN transistor 278 in the AC static switch control circuit 260. The collector of transistor 278 is connected through a resistor 280 to a B+ voltage supply source and the emitter of the transistor is connected through a resistor 282 to ground G. The junction of resistor 282 and the emitter of transistor 278 is connected to the gate of triac 284, having its terminal T1 connected to ground G and its terminal T2 connected to the output circuit O2. In circuit 252, terminal T2 is connected to output circuit O3. The output of NOR circuit 274 is also connected through the anode-cathode circuit of a diode 286, poled as shown in FIGURE 9, to the input of a NOR circuit 288. Similarly, the input side of NOR circuit 274 is also connected to the input of NOR circuit 288 through the anode-cathode circuit of a diode 290, poled as shown in FIGURE 9. The output of NOR circuit 288 is connected through a resistor 291 to the base of an NPN transistor 292, having its emitter connected to ground G through a resistor 294 and its collector connected to a B+ voltage supply source through a resistor 296. The junction of the emitter of transistor 292 and resistor 294 is connected to the gate of a triac 298 having its terminal T1 connected to ground G and its terminal T2 connected to output O1.

The offset selector OS serves to compare the values of the analog voltage outputs from summation device SM-O and SM-I to detremine whether the ratio of one output voltage to the other differs from a reference ratio, and, if so, one of the preferential offset outputs O2 or O3 will be energized. Otherwise, output O1 is energized for providing an average offset. The reference ratio, in each case, is set on potentiometers 262 or 264. Each potentiometer serves as a reference ratio means and multiplies the applied voltage by the set ratio, and then applies the resultant voltage through the wiper arm to its associated differential amplifier. If it is desired that a preferential offset for the inbound direction I be in effect when the ratio of the volume-occupancy level in the inbound direction to that in the outbound direction exceeds the ratio 4 to 2, then a ratio of 4 to 2 is set by the tap on potentiometer 262 in circuit 250. That is, the tap is set such that if four volts is applied across the potentiometer, only two volts will be applied by the wiper arm to the differential amplifier 254. If, in this example, the output voltage of the summation device SM-I exceeds the output voltage of summation device SM-O by more than the ratio 4 to 2, the differential amplifier 254 will provide a positive potential, i.e., a binary "1" signal at its output circuit. It may also be desired that when the ratio of the volume-occupancy level in direction I to that in direction O falls below a lower ratio, such as 3 to 2, then no preferential offset will be allocated, and that an average offset be allocated, as by de-energizing output circuit O2 and energizing output circuit O1. In this case, a ratio of 3 to 2 is set on potentiometer 264 in circuit 250 so that when the ratio falls below 3 to 2 a positive signal, i.e., a binary "1" signal, is developed at the output circuit of differential amplifier 256.

Similarly, in circuit 252 the same ratios may be used with respect to energizing output circuit O3 for an outbound preferential offset. Thus, in circuit 252, when the ratio of the output voltage from summation device SM-O to that from summation device SM-I exceeds a ratio of 4 to 2, a binary "1" signal will be developed at the output of differential amplifier 254. Also, when this ratio falls below 3 to 2, a binary "1" signal will be present on the output circuit of differential amplifier 256.

In operation, and with the ratios being set as discussed above, we may assume traffic flow is initially at a balanced condition. In such case, each differential amplifier 256 in circuits 250 and 252 applies a binary "1" signal to the input circuit of its associated NOR circuit 272. Accordingly, the output circuit of each NOR circuit 270 applies a binary "1" signal to the input circuit of its associated NOR circuit 274. Thus, the output circuit of each NOR circuit 274 applies a binary "0" signal to the base of its associated transistor 278 to maintain the transistor reversed biased, whereby output circuits O2 and O3 are de-energized. Also, the output circuit of each NOR circuit 274 applies a binary "0" signal through a diode 286 to the input circuit of NOR circuit 288. Thus, the output circuit of NOR circuit 288 applies a binary "1" signal to the base of transistor 292 to forward bias this transistor into conduction. A positive voltage now appears across resistor 294 so as to apply a forward biasing signal to the gate of triac 298 to energize output circuit O1 for transmitting an average offset signal to the slave relay circuit SRC.

As the level of traffic flow in the inbound direction I increases with respect to that in the outbound direction O, the inbound to outbound ratio may exceed the reference ratio of 3 to 2 set on potentiometer 264 in circuit 250. In such case, the output circuit of differential amplifier 256 applies a binary "0" signal to the input circuit of NOR circuit 272. However, this will not change the stable state of multivibrator circuit 258 since the output circuit of NOR circuit 270 applies a binary "1" signal to the input circuit of NOR circuit 272. But, when the ratio of the inbound flow to the outbound flow exceeds the ratio 4 to 2 set on potentiometer 262 in circuit 250, the output circuit of differential amplifier 254 applies a binary "1" signal to the input circuit of NOR circuit 270. This changes the stable state of multivibrator circuit 258 and the output circuit of NOR circuit 270 applies a binary "0" signal to the input circuit of NOR circuit 274. Thus, the output circuit of NOR circuit 274 applies a binary "1" signal through diode 286 to the input circuit of NOR circuit 288. The output circuit of NOR circuit 288 applies a binary "0" signal to the base of transistor 292 to reverse bias this transistor and de-energize output circuit O1. Also, the output circuit of NOR circuit 274 applies a binary "1" signal to the base of transistor 278 to forward bias this transistor into conduction and, hence, energize the inbound preferential offset circuit O2.

If the ratio of traffic flow in the inbound direction to that in outbound direction now decreases to the point that it is below the ratio of 3 to 2, as set on potentiometer 264 in circuit 250, the output circuit of differential amplifier 256 applies a binary "1" signal to the input circuit of NOR circuit 272. This changes the stable state of multivibrator circuit 258 back to its original condition and the output circuit of NOR circuit 270 applies a binary "1" signal to the input circuit of NOR circuit 274. This de-energizes the inbound preferential offset output circuit O2 and energizes the average offset output circuit O1. The operation of circuit 252 is essentially the same as that of circuit 250 described above with the exception that a comparison is made as to whether the volume-occupancy level of traffic flow in direction O to that in direction I is greater than the ratio of 4 to 2, and if so the outbound preferential offset circuit O3 is energized. Also, when that ratio of traffic flow decreases below the ratio of 3 to 2, the preferential outbound offset selector circuit O3 is de-energized and the average offset output circuit O1 is energized.

SPLIT SELECTOR

Figure 10:
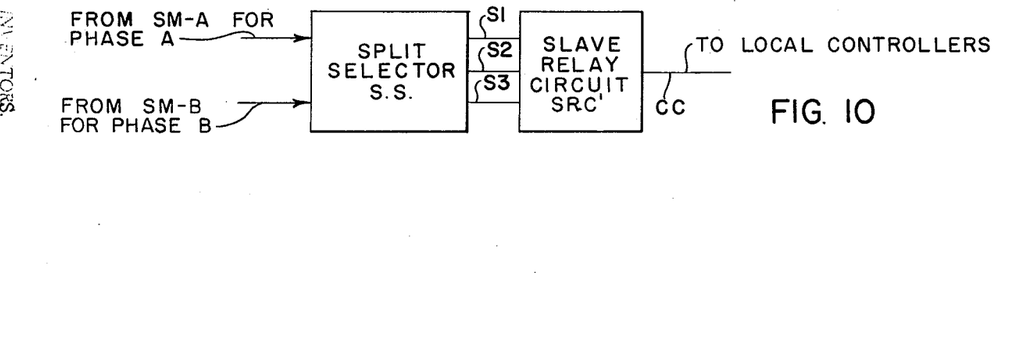
FIGURE 10 is a block diagram illustration of a split selector.

As discussed previously with respect to FIGURE 2, the output of the summation device SM is applied to a function selector FS, the output of which is connected to the local controllers through an interconnecting cable CC for purposes of controlling such traffic functions as cycle length, offset and split. The function selector FS may include a cycle length selector, as described hereinbefore with respect to FIGURES 5, 6 and 7, and/or an offset selector, as described hereinbefore with respect to FIGURES 8 and 9. In addition, or alternatively, the function selector may also take the form of a split selector SS, as illustrated in FIGURE 10. The split selector SS has two inputs, one connected to the output of a summation device SM–A, which is preferably constructed as illustrated in FIGURES 2 and 4, and which is connected through circuitry as shown in FIGURE 4 to detector D1 and/or D2 (see FIGURE 1) for purposes of developing an analog voltage signal representative of the volume-occupancy level of traffic flow in phase A. Similarly, the other input of the split selector SS is taken from the output of a second summation device SM–B, and which is also constructed as illustrated in FIGURES 2 and 4, and which is connected through circuitry as shown in FIGURE 4, to detectors D3 and/or D4 (see FIGURE 1) and serves to develop an analog voltage signal representative of the volume-occupancy level of traffic flow in phase B. The split selector SS has three outputs S1, S2 and S3 connected to a slave relay circuit SRC', and which, in turn, has its output connected to the local controllers LC1 and LC2 through an interconnecting cable CC. If the traffic flow is balanced in phase A and phase B, split 1 may be allocated to provide a 50–50 split of the cycle length of operation of local controller LC1. That is, each phase will be given an equal interval of right-of-way period of time during each cycle of operation of local controller LC1. If, however, traffic flow in phase A is sufficiently great with respect to that in phase B, then a split favoring phase A, such as a 60–40 split in favor of phase A, will be allocated by energizing output S2. Similarly, when the level of traffic flow in phase B is sufficiently great with respect to that in phase A, output S3 is energized to transmit a split determining signal to the local controllers, such as a 40–60 split, favoring phase B. The split selector SS together with its associated slave relay circuit SRC' may be constructed as shown in the United States patent application to George D. Hendricks, Ser. No. 534,603, filed Feb. 10, 1966, and assigned to the same assignee as the present invention.

In accordance with the present invention, however, the internal circuitry of the split selector SS takes the form as that of the offset selector OS illustrated in FIGURE 9. That is, with respect to FIGURE 9, the inputs are changed from SM–O to SM–A, and from SM–I to SM–B. Also, the outputs are changed from O1, O2, O3 to S1, S2, S3, respectively. Using the same ratios as discussed with respect to the description of operation for the offset selector OS, it will now be appreciated that with balanced traffic flow in phase A and phase B, output S1 will be energized. Also, when the ratio of the volume-occupancy level in phase A to that in phase B exceeds the ratio of 4 to 2, output S2 will be energized. Similarly, when the ratio of volume-occupancy level in phase B to that in phase A exceeds the ratio 4 to 2, output S3 will be energized.

DETECTOR TRANSFER CIRCUIT

In FIGURE 1 there is illustrated two detectors D1 and D5 for detecting traffic in the inbound direction I in phase A. Detector D1 is the primary detector, and thus far little mention has been made herein of detector D5. Detector D5, which is constructed in the same manner as detector D1, is located at the same sampling station as is detector D1, and serves as a secondary detector. By means of the detector transfer circuit DT, illustrated in FIGURE 11, detector D5 is substituted, under conditions to be described hereinafter, for detector D1. Thus, for example, in the event that detector D1 fails through some malfunction the system would break down in the absence of the substitution of secondary detector D5. Also, a vehicle may be stalled over detector D1 so that false information is supplied by the detector to the master controller MC. The detector transfer circuit DT serves under these circumstances for substituting detector D5 for detector D1.

Figure 11:
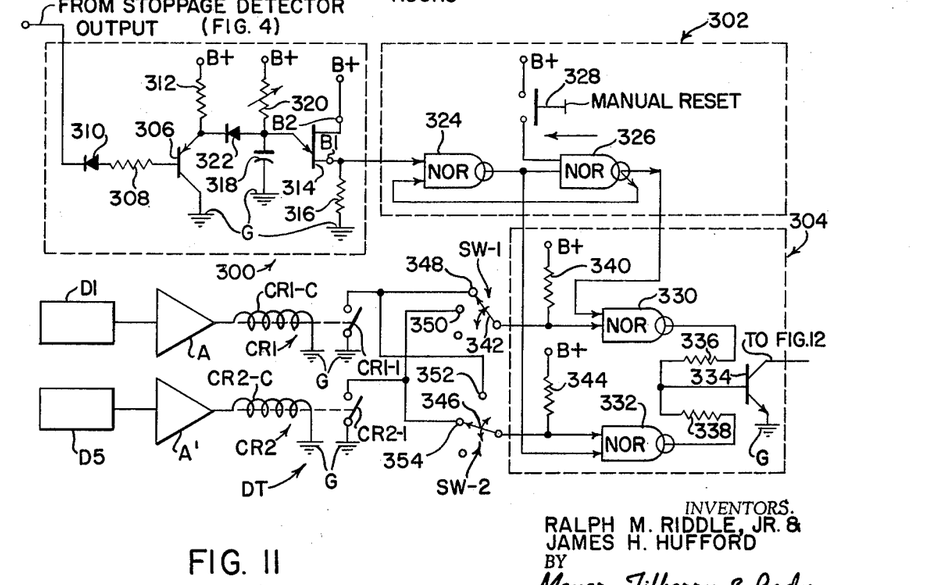
FIGURE 11 is a combined schematic block diagram illustration of a detector transfer circuit.

Referring more particularly to FIGURE 11, detector transfer circuit DT generally comprises a timing circuit 300, a bistable multivibrator circuit 302, a detector transfer control circuit 304, a primary detector select switch SW–1 and a secondary detector selector switch SW–2.

Timer circuit 300 includes a normally conductive PNP transistor 306, having its base connected through a resistor 308 and the anode to cathode circuit of a diode 310, poled as shown in FIGURE 11, to the output circuit of the stoppage detector SD, taken at the output circuit of NOR circuit 134 in FIGURE 4. Transistor 306 has its collector connected to ground G and its emitter connected through a resistor 312 to a B+ voltage supply source.

Timer circuit 300 also includes a unijunction transistor 314 having its base B2 connected to a B+ voltage supply source and its base B1 connected to ground G through a resistor 316. A timing capacitor 318 is connected between ground and the emitter of transistor 314, as well as through a variable timing resistor 320 to a B+ voltage supply source. The junction of capacitor 318 and resistor 320 is connected through the anode-cathode circuit of a diode 322, poled as shown in FIGURE 11, to the emitter of transistor 306.

The bistable multivibrator circuit 302 includes two NOR circuits 324 and 326 connected together to define a bistable multivibrator. One input of NOR circuit 324 is taken from base B1 of unijunction transistor 314. One input of NOR circuit 326 is connected through a normally open, manual reset switch 328 to a B+ voltage supply source.

The control circuit 304 includes two NOR circuits 330 and 332, and an NPN transistor 334. One input of NOR circuit 330 is taken from the output circuit of NOR circuit 326 and one input of NOR circuit 332 is taken from the output of NOR circuit 324. The outputs of NOR circuits 330 and 332 are respectively connected through resistors 336 and 338 to the base of transistor 334. Transistor 334 has its emitter connected to ground G. The collector of transistor 334 serves as the output of circuit DT. A second input of NOR circuit 330 is connected through a resistor 340 to a B+ voltage supply source, as well as to a movable contact 342 of switch SW–1. Similarly, a second input of NOR circuit 332 is connected through a resistor 344 to a B+ voltage supply source, as well as to the movable contact 346 of switch SW–2.

Switch SW–1 also includes stationary contacts 348 and 350. Switch SW–2 also includes stationary contacts 352 and 354, which are respectively connected to stationary contacts 348 and 350 of switch SW–1. Detector D1, in a manner similar to that as illustrated in FIGURES 2 and 4, is connected through an amplifier A and relay coil CR1–C of relay CR1 to ground G. Relay CR1 also includes a set of normally open contacts CR1–1 which are located between ground G and the junction of stationary contacts 348 and 352. Similarly, detector D5 is connected through an amplifier A' and a relay coil CR2–C of a relay CR2 to ground G. Relay CR2 includes a set of normally open contacts CR2–1 connected between ground G and the junction of stationary contacts 350 and 354.

In operation, either detector D1 or detector D2 may serve as the primary detector, dependent upon the positioning of movable contacts 342 and 346 of switches SW–1 and SW–2. In the illustration shown in FIGURE 11, detector D1 is the primary detector and detector D5 is the secondary detector. If relay contacts CR1–1 remain closed for an exceedingly long period of time, such as due to a malfunction or because a vehicle is stalled in the zone of influence of detector D1, the stoppage detector SD, illustrated in FIGURE 4, will be activated, whereby a binary "1" signal is present on its output circuit taken at the output circuit of NOR circuit 134. Thus, it will be appreciated that with relay contact CR1–1 closed for an exceedingly long period of time, the output level of the volume-occupancy voltage as taken from the output of summation device SM in FIGURE 4, will exceed the reference set on potentiometer 102 in FIGURE 4. After a predetermined period of time the multivibrator circuit 108 will change its stable state so that a binary "1" signal appears on its output circuit. For a more detailed description, reference should be made to the previous description of the operation of stoppage detector SD.

The output of the stoppage detector SD is applied to the cathode of diode 310 in timer circuit 300. When the output is a binary "0" signal, i.e., a ground signal, the diode is forward biased and transistor 306 is conductive so as to provide a short circuit for timing capacitor 318. Accordingly, unijunction 314 is not conductive and a binary "0" signal is applied to the input of NOR circuit 324 in the bistable multivibrator circuit 302. The output circuit of NOR circuit 324 applies a binary "1" signal to the input circuit of NOR circuit 332, and the output circuit of NOR circuit 326 applies a binary "0" signal to the input circuit of NOR circuit 330. Since a binary "1" signal is applied to the input circuit of NOR circuit 332, its output circuit applies a binary "0" signal to the base of transistor 334 which does not forward bias this transistor. Accordingly, any closure of relay contacts CR2–1 merely applies a ground signal, i.e., a binary "0" signal, to the input circuit of NOR circuit 332 without any effect on the output of this NOR circuit. Although the output of NOR circuit 326 applies a binary "0" signal to NOR circuit 330, the output of NOR circuit 330 is a binary "0" signal in the absence of a closure of relay contacts CR1–1. More particularly, the second input of NOR circuit 330 is connected through resistor 340 to the B+ voltage supply source, which serves as a source of a binary "1" signal. Upon closure of relay contacts CR1–1 the second input to NOR circuit 330 is referenced to ground potential, whereupon a binary "1" signal is applied from the output of NOR circuit 330 to the base of transistor 334. This forward biases transistor 334 so as to provide a ground signal at the output of the detector transfer circuit DT so long as a vehicle is present in the zone of influence of detector D1.

When the output from stoppage detector SD changes from a binary "0" signal to a binary "1" signal, diode 310 in timer circuit 300 is reversed biased, as is also transistor 306. Thus, the short circuit is removed from capacitor 318 which now commences to charge toward the value of the B+ voltage supply source. When the level of the voltage stored by capacitor 318 attains the level equal to the peak point voltage of unijunction transistor 314, the capacitor discharges through the emitter to base B2 of the transistor to develop a positive voltage pulse across resistor 316. This positive voltage pulse serves as a binary "1" signal, and is applied to the input of NOR circuit 324. This changes the stable state of multivibrator circuit 302 so that NOR circuit 324 applies a binary "0" signal to the input of NOR circuit 332, and NOR circuit 326 applies a binary "1" signal to the input of NOR circuit 330. NOR circuit 330, in turn, applies a binary "0" signal to the base of transistor 334 without effect, thereby eliminating the sampling by detector D1. Since a binary "0" signal is now applied to the input of NOR circuit 332, its output circuit applies a binary "1" signal to the base of transistor 334 so long as relay contacts CR2–1 are closed, whereupon a ground signal appears on the output of the detector transfer circuit DT as taken at the collector of transistor 334. Accordingly, detector D5 has now been substituted for detector D1 in the sampling operation. The circuit may be reset to its original condition by a momentary closure of manual reset switch 328, which serves to change the stable state of multivibrator circuit 302 to its original condition.

MASTER CONTROLLER

Figure 12:
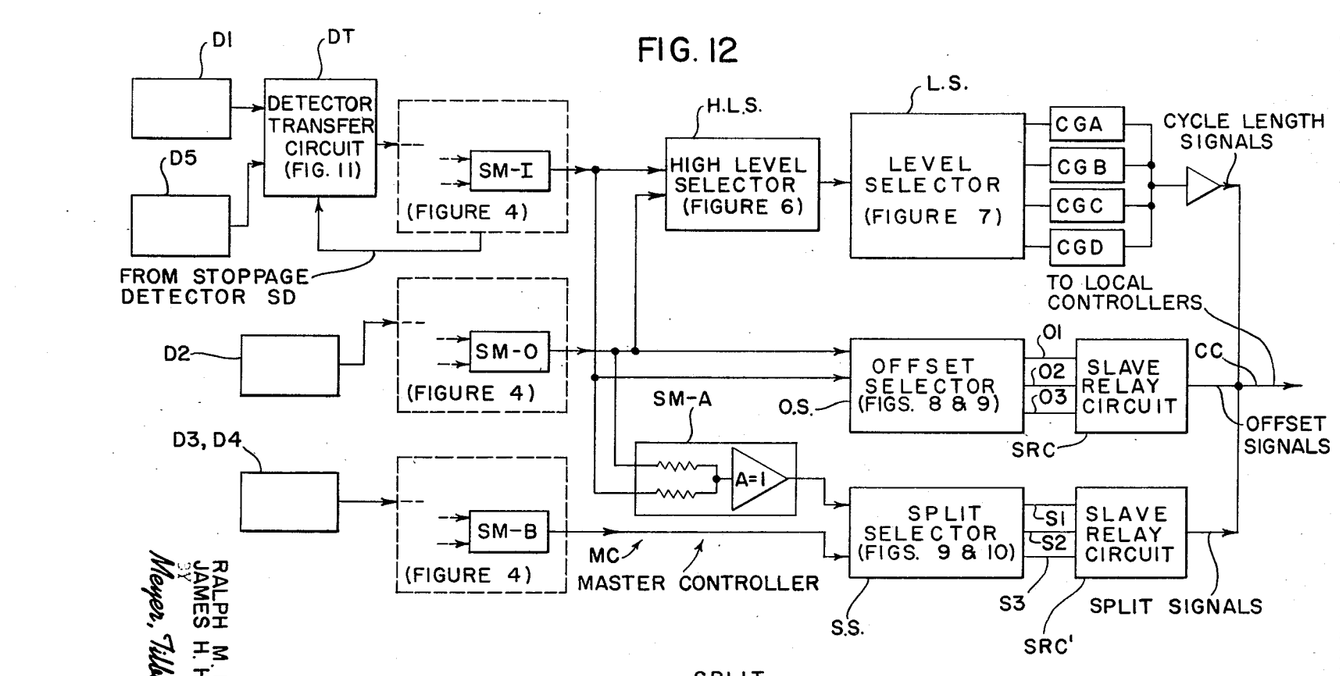
FIGURE 12 is a block diagram illustration of a master controller incorporating the invention.

Having now described various aspects of the invention, it will be appreciated the various aspects may be combined, in the manner as shown in FIGURE 12, so that the master controller MC performs all of the functions discussed hereinbefore. In review, it will be appreciated that the function selector FS may serve to provide cycle length signals, offset signals and split signals to the local controllers through an interconnecting cable CC. The cycle length signals are derived from sampling traffic flow in the inbound direction I and in the outbound direction O in phase A. Accordingly, the detectors D1 and D5 are connected through a detector transfer circuit DT and then to a volume-occupancy computer network, together with a stoppage detector circuit, all as shown in FIGURE 4, so that a summation device SM–I provides an analog output voltage signal representative of the volume-occupancy level of traffic flow in direction I. Similarly, detector D2 is connected through circuitry as shown in FIGURE 4 so that a summation device SM–O develops an analog voltage output signal representative of the volume-occupancy level of traffic flow in direction O. The outputs of summation devices SM–I and SM–O are applied to a high level selector HLS, as illustrated in FIGURE 6, which serves to select the analog voltage representative of the high level of traffic flow in directions I and O. The output of the high selector HLS is, in turn, applied to a level selector LS, constructed as shown in FIGURE 7. One of four cycle generator, CGA, CBB, CGC or CGD, is energized by the level selector so that a cycle length is applied over the interconnected cable CC to the local controllers.

An offset selector OS, constructed as shown in FIGURES 8 and 9, is connected to the output of summation devices SM–I and SM–O. The offset selector serves to compare the ratio of the analog values of the volume-occupancy level in the inbound and outbound direction against a reference ratio for purposes of energizing either an average offset output O1, or an inbound preferential offset circuit O2, or an outbound preferential offset output O3. These circuits are coupled to a slave relay circuit SRC to apply an offset determining signal over the interconnecting cable CC to the local controllers. Similarly, detectors D3 and D4 are combined and connected to a circuit, as shown in FIGURE 4, so that a summation device SM–B provides an analog voltage signal representative of the volume-occupancy level of traffic flow in phase B. The outputs of summation devices SM–I and SM–O may be averaged in a summation device SM–A, constructed as shown with respect to summation device SM illustrated in FIGURE 4, but having an amplifier gain of one. The outputs of summation devices SM–A and SM–B are applied to a split selector SS, constructed as illustrated in FIGURES 9 and 10. The split selector SS serves to compare a ratio of the volume-occupancy levels of traffic flow in phase A and B with a reference ratio, and then energize one of three split output circuits S1, S2 or S3, which are coupled to a slave relay circuit SRC' for purposes of applying a split determining signal through the interconnecting cable CC to the local controllers.

The invention has been described in connection with a preferred embodiment but is not to be limited to same. Various modifications may be made without departing from the scope and spirit of the present invention as defined by the appended claims.

We claim:

1. Traffic control apparatus comprising:
   first means for providing a volume level signal representative of the level of traffic volume in a first direction of traffic flow;
   second means for providing an occupancy level signal representative of the level of traffic occupancy in said first direction of traffic flow;
   signal combining means coupled to the outputs of said first and second means providing a volume-occupancy level signal having a single characteristic representative of a particular combination of said volume and occupancy levels in said first direction; and,
   traffic function selector control circuit means for control of at least one local traffic signal controller and coupled to said signal combining means to be controlled thereby.

2. Traffic control apparatus as set forth in claim 1, wherein said signal combining means is a summing means for providing a volume-occupancy level signal having a signle characteristic representative of an algebraic summation of said traffic volume level and said traffic occupancy level in said first direction of traffic flow.

3. Traffic control apparatus as set forth in claim 1, wherein said traffic function selector control circuit means includes cycle length signal control means coupled to said signal combining means for providing a cycle length determining signal for application to at least one said local traffic signal controller.

4. Traffic control apparatus as set forth in claim 3, wherein said cycle length signal control means includes a level selector circuit means having one input coupled to said signal combining means for receiving said volume-occupancy level signal and a normally energized output and a plurality of selectively energizable outputs.

5. Traffic control apparatus as set forth in claim 1, including another said first means and another said second means and another said signal combining means, all for a second direction of traffic flow for providing said volume-occupancy level signal representative of a said particular combination of said volume and occupancy levels in said second direction;
   said traffic function selector control means being coupled to both said signal combining means for receiving said volume-occupancy level signals for said first and second directions of traffic flow.

6. Traffic control apparatus as set forth in claim 5, wherein said traffic function selector control means includes:
   means for comparing a given ratio of said volume-occupancy signal with said reference ratio, said comparing means developing a function control signal when said given ratio is different from said reference ratio; and,
   traffic function control means coupled to said comparing means and responsive to said control signal for controlling a said local signal controller.

7. Traffic control apparatus comprising:
   first means for providing a volume level signal represenative of the level of traffic volume in a first direction of traffic flow;
   second means for providing an occupancy level signal representative of the level of traffic occupancy in said first direction of traffic flows;
   signal combining means coupled to the outputs of said first and second means for providing a volume-occupancy level signal representative of a particular combination of said volume and occupancy levels in said first direction;
   traffic function selector control circuit means for control of at least one local traffic signal controller and coupled to said signal combining means to be controlled thereby;
   said first means includes traffic volume computing means adapted to be connected with traffic detector means for developing an analog voltage signal which varies over a range of values in accordance with the traffic volume level in said first direction;
   said second means includes traffic occupancy computing means adapted to be connected with traffic detector means for developing an analog voltage signal which varies over a range of values in accordance with the traffic occupancy level in said first direction; and,
   said signal combining means includes circuit means for combining said analog voltage signals for providing an analog voltage signal having a magnitude which varies over a range of values in accordance with said particular combination of said volume and occupancy levels in said first direction.

8. Traffic control apparatus as set forth in claim 7, wherein said signal combining means is a summing means for summing said analog voltage signals for continuously providing an analog voltage signal which varies over a range of values in accordance with a summation of said traffic volume level and said traffic occupancy level in said first direction.

9. Traffic control apparatus comprising:
   first means for providing a volume level signal represenatative of the level of traffic volume in a first direction of traffic flow;
   second means for providing an occupancy level signal representative of the level of traffic occupancy in said first direction of traffic flow;
   signal combining means coupled to the outputs of said first and second means for providing a volume-occupancy level signal representative of a particular combination of said volume and occupancy levels in said first direction;
   traffic function selector control circuit means for control of at least one local traffic signal controller and coupled to said signal combining means to be controlled thereby;
   said traffic function selector control circuit means includes cycle length signal control means coupled to said signal combining means for providing a cycle length determining signal for application to at least one said local traffic signal controller;
   said cycle length signal control means includes a level selector circuit means having one input coupled to said signal combining means for receiving said volume-occupancy level signal and a normally energized output and a plurality of selectively energizable outputs;
   said level selector circuits means includes a control circuit for each of said selectively energizable outputs, each said control circuit including:
      first reference signal means for providing a first reference signal;
      first comparison means coupled to said first reference signal means and said signal combining means for developing a first control signal so long as said volume-occupancy signal is greater than said first reference signal;
      bistable means coupled to said first comparison means and having a normal first condition and a second condition in response to a said first control signal; and
      circuit means coupled to said bistable means and said normally energized output and one of said selectively energizable outputs for de-energizing said normally energized output and energizing said one selectively energizable output when said bistable means is in its second condition.

10. Traffic control apparatus as set forth in claim 9, wherein each said control circuit further includes:
second reference signal means for providing a second reference signal;
second comparison means coupled to said second reference signal means for developing a second control signal so long as said volume-occupancy signal is less than said second reference signal; and
said bistable means being coupled to said second comparison means and controlled thereby so as to be in its normal condition when the last received signal is said second control signal.

11. Traffic control apparatus comprising:
first means for providing a volume level signal representative of the level of traffic volume in a first direction of traffic flow;
second means for providing an occupancy level signal representative of the level of traffic occupancy in said first direction of traffic flow;
signal combining means coupled to the outputs of said first and second means for providing a volume-occupancy level signal representative of a particular combination of said volume and occupancy levels in said first direction;
traffic function selector control circuit means for control of at least one local traffic signal controller and coupled to said signal combining means to be controlled thereby;
another said first means and another said second means and another said signal combining means, all for a second direction of traffic flow for providing said volume-occupancy level signal representative of a said particular combination of said volume and occupancy levels in said second direction;
said traffic function selector control means being coupled to both said signal combining means for receiving said volume-occupancy level signals for said first and second directions of traffic flow;
said traffic function selector control means has a normally energized output and a plurality of selectively energizable outputs and a control circuit for each of said selectively energizable outputs, each said control circuit including:
first reference ratio means;
circuit means for applying one of said volume-occupancy signals to said reference ratio means to multiply said one signal by said first reference ratio;
first comparison means for comparing said multiplied one signal with said other signal and developing a first control signal so long as said multiplied one signal is greater than said other signal;
bistable means coupled to said first comparison means and having a normal first condition and a second condition in response to a said first control signal; and,
circuit means coupled to said bistable means and said normally energized output and one of said selectively energizable outputs for de-energizing said normally energized output and energizing said selectively energizable output when said bistable means is in its second condition.

12. Traffic control apparatus as set forth in claim 11, wherein each of said control circuits further includes:
second reference ratio means;
second circuit means for applying said one signal to said second reference ratio means to multiply said one signal by said second reference ratio;
second comparison means for comparing said multiplied one signal by said second reference means with said other signal and developing a second control signal so long as said other signal is greater than said multiplied one signal as multiplied by said second reference ratio means; and,
said bistable means being coupled to said second comparison means and controlled thereby so as to be in its normal condition when the last received signal is said second control signal.

13. Traffic control apparatus comprising:
first means for providing a volume level signal representative of the level of traffic volume in a first direction of traffic flow;
second means for providing an occupancy level signal representative of the level of traffic occupancy in said first direction of traffic flow;
signal combining means coupled to the outputs of said first and second means for providing a volume-occupancy level signal representative of a particular combination of said volume and occupancy levels in said first direction;
traffic function selector control circuit means for control of at least one local traffic signal controller and coupled to said signal combining means to be controlled thereby;
said first means includes traffic volume computing means adapted to be connected with traffic detector means for developing an analog voltage signal which varies over a range of values in accordance with the traffic volume level in said first direction;
said second means includes traffic occupancy computing means adapted to be connected with traffic detector means for developing an analog voltage signal which varies over a range of values in accordance with the traffic occupancy level in said first direction;
said signal combining means includes circuit means for combining said analog voltage signals for providing an analog voltage signal which varies over a range of values in accordance with said particular combination of said volume and occupancy levels in said first direction;
each said volume and occupancy computing means has a computing condition and a holding condition during which it maintains its output analog voltage signal at its current level,
stoppage detector means coupled to both said computing means and said signal combining means for actuating both said computing means to a holding condition when said volume-occupancy analog voltage signal attains a predetermined value.

14. Traffic control means as set forth in claim 13, wherein said stoppage detector means includes:
voltage level detection means coupled to said signal combining means for developing a control signal when said volume-occupancy analog voltage signal attains a predetermined level; and
bistable means coupled to said voltage level detection means and having a normal first condition and a second condition for providing a computer holding signal for actuating both said computing means to a said holding condition.

15. Traffic control apparatus as set forth in claim 14, including timing means coupled to said voltage level detection means and said bistable means for actuating said bistable means to its second condition after a predetermined period of time has elapsed from a development of a said control signal by said voltage level detection means.

16. Traffic control apparatus as set forth in claim 15, wherein said timing means includes circuit means adapted for connection with the traffic detector means associated with said computing means for resetting said timing means upon each traffic detection, whereby said bistable means is not actuated to its second condition so long as successive detections of traffic in said first direction are spaced in time less than said predetermined period of time.

17. Traffic control apparatus as set forth in claim 13, wherein said computing means and said stoppage detector means are normally connected to a primary traffic detector for detecting traffic in said first direction;
   a second traffic detector adapted to be substituted for said primary traffic detector for detecting traffic in said first direction; and
   detector transfer means coupled to said detectors and said stoppage detector means and controlled by said stoppage detector means for disconnecting said primary traffic detector and substituting therefor said secondary traffic detector.

18. Traffic control apparatus as set forth in claim 17, wherein said detector transfer means includes:
   timing circuit means coupled to said stoppage detector means for timing a predetermined period of time and then providing a switching signal;
   bistable circuit means coupled to said timing circuit means and having a normal first condition and a second condition in response to a said switching signal; and;
   detector transfer switch control circuit means coupled to and controlled by said bistable circuit means for disconnecting said primary detector and substituting therefor said secondary detector when said bistable circuit means is in its second condition.

References Cited

UNITED STATES PATENTS

| | | | |
|---|---|---|---|
| 3,047,838 | 7/1962 | Hendricks | 340—31 |
| 3,241,107 | 3/1966 | Du Vivier | 340—36 |
| 3,254,324 | 5/1966 | Casciato et al. | 340—35 |
| 3,258,744 | 6/1966 | Auer | 340—37 |
| 3,267,425 | 8/1966 | Auer | 235—150.24 |
| 3,278,896 | 10/1966 | Auer | 340—35 |
| 3,305,828 | 2/1967 | Auer et al. | 340—40 |
| 3,305,827 | 2/1967 | Auer et al. | 340—36 |
| 3,307,146 | 2/1967 | Auer et al. | 340—35 |
| 3,315,065 | 4/1967 | Auer | 235—150.24 |
| 3,374,340 | 3/1968 | Auer et al. | 235—150.24 |

EUGENE G. BOTZ, Primary Examiner

R. W. WEIG, Assistant Examiner

U.S. Cl. X.R.

340—31, 35, 40